United States Patent [19]

Kinder

[11] 4,353,505

[45] Oct. 12, 1982

[54] SPRAYING APPARATUS

[76] Inventor: Leon Kinder, P.O. Box AE, Denton, Tex. 76201

[21] Appl. No.: 174,953

[22] Filed: Aug. 4, 1980

[51] Int. Cl.$^3$ .............................................. B05G 1/16
[52] U.S. Cl. ................................. 239/167; 239/170; 239/176; 239/288
[58] Field of Search ............... 239/159, 163, 166, 167, 239/168, 169, 170, 172, 175, 176, 288

[56] References Cited

U.S. PATENT DOCUMENTS

| | | |
|---|---|---|
| 1,028,288 | 6/1912 | Schoentag et al. |
| 2,475,686 | 7/1949 | Anderson |
| 2,551,870 | 5/1951 | Bridger, Jr. |
| 2,581,078 | 1/1952 | Malin et al. ........................ 239/104 |
| 2,637,594 | 5/1953 | Spedding |
| 2,740,664 | 4/1956 | Yates ................................. 239/104 |
| 2,977,715 | 4/1961 | Lindsay |
| 3,118,607 | 1/1964 | Rocher |
| 3,202,359 | 8/1965 | Gill, Jr. |
| 3,301,487 | 1/1967 | Young ............................ 239/170 X |
| 3,512,714 | 4/1968 | Phelps et al. |
| 3,540,632 | 11/1970 | Clingan |
| 3,601,314 | 8/1971 | Hurt |
| 3,792,814 | 2/1974 | Platz |
| 3,796,353 | 3/1974 | Smrt |
| 3,998,387 | 12/1976 | Maasberg |
| 4,015,855 | 4/1977 | Murray |
| 4,023,507 | 5/1977 | van der Lely |

Primary Examiner—Robert B. Reeves
Assistant Examiner—Paul A. Sobel
Attorney, Agent, or Firm—Sigalos & Levine

[57] ABSTRACT

An improved drift free spraying apparatus adapted for movement in connection with a vehicle and having a spray bar mounted within a bottomless, rectangular, box-type housing in communication with a fluid pump and reservoir assembly and adapted for emitting fluid in a mist configuration upon the surface to be sprayed through nozzles provided in the spray bar, the improvement comprising an elongated, bottomless, rectangular, box-type housing having first and second outer sections hingedly attached to a center section, an individual spray bar mounted within each section, means coupled to each spray bar for individual control of the emitting fluid to the spray bar, and means coupled to the first and second outer sections for selectively raising and lowering each section.

9 Claims, 10 Drawing Figures

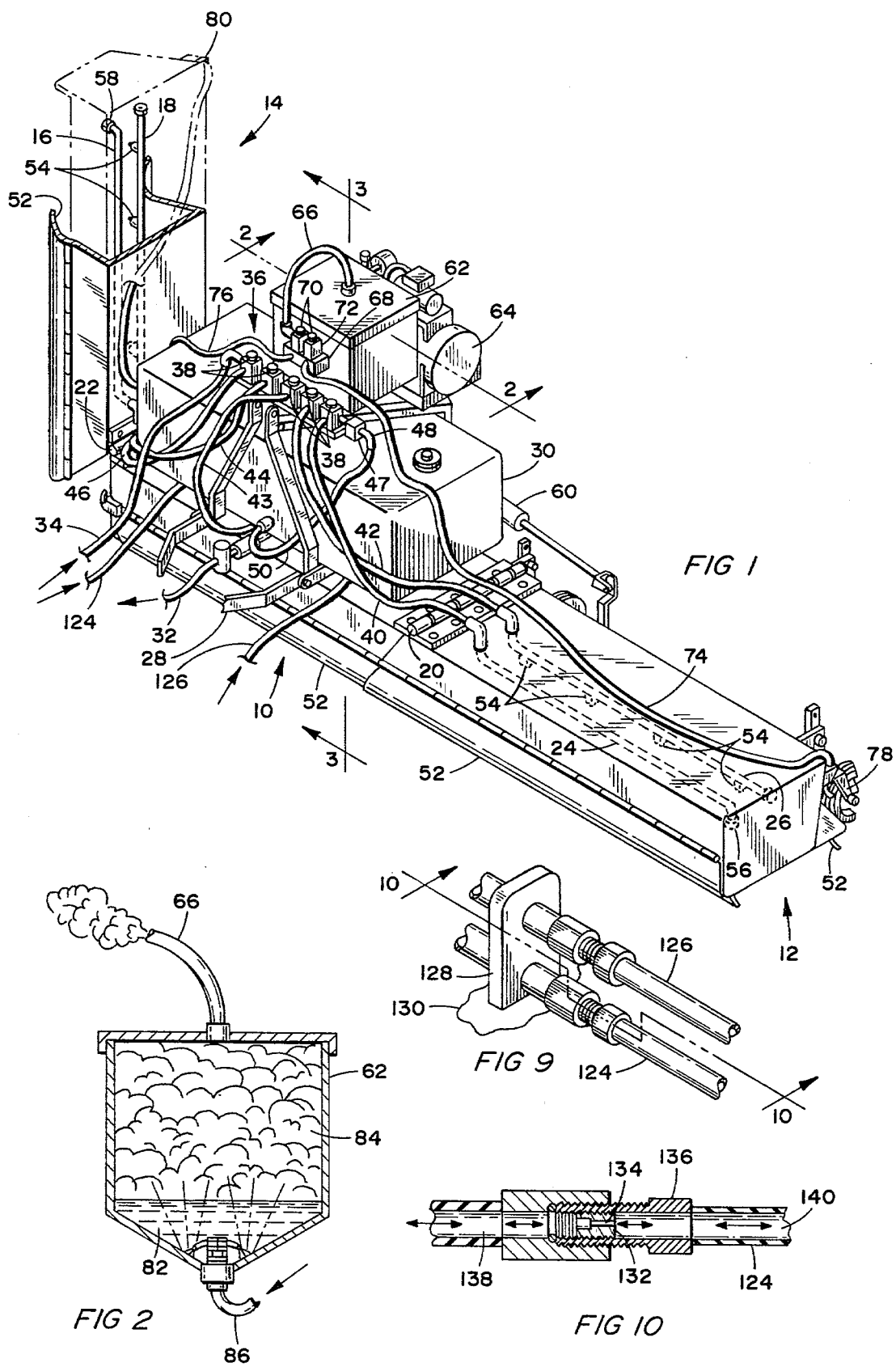

SPRAYING APPARATUS

BACKGROUND OF THE INVENTION

The invention relates to an improved apparatus for spraying chemicals, and, more particularly, to a herbicide, insecticides, and fungicides spraying unit adapted for towable attachment to a tractor to facilitate drift free application of the spray.

It is generally the practice when spraying chemicals such as herbicides and insecticides to eject the chemical in a fine mist upon the foliage being treated. Often times, however, winds cause the mist to drift away from the subject foliage before the same is contacted by the spray. This creates two problems. First, the purpose of the spraying is frustrated in that the subject foliage is not treated, and, secondly, the drift of the spray often contacts surrounding areas, and people and wildlife in the surrounding areas, which are detrimentally affected by the spray. This two-fold problem has been addressed by certain prior art spraying devices which have provided focusing spray nozzles which intensify the spray stream to reduce drift contamination. However, such devices generally alter the mist characteristics of the chemical and reduce the treatment effectiveness thereof.

Other prior art approaches to reducing spray contamination caused by drift have included spray bars designed for use very close to the surface to be sprayed whereby the spray pressure can be substantially reduced. Such an effect reduces mist drift, but also reduces the rate at which the chemical can be applied as well as changing the mist characteristics. Furthermore, nozzle modifications for controlling mist drift are generally inconsistent with optimal spraying configurations from a technical standpoint. Consequently, applicant previously designed a spraying apparatus which could incorporate optimal spray nozzle configurations in an assembly providing confined spray application and the elimination of drift contamination. This invention issued as U.S. Pat. No. 4,186,879 on Feb. 5, 1980. The invention in the issued patent includes a spray bar enclosed in an elongated housing adapted for ambulatory surface engagement. The housing includes flexibly mounted fore and aft walls for conforming to uneven surfaces over which the housing is permitted to move. The spray from the spray bar is confined therein during all wind conditions.

The use of the invention as set forth in the issued patent disclosed above is extremely effective in confining the mist to the enclosed container and preventing it from reaching areas which are detrimentally affected by the spray.

However, it has been found desirable to increase the size or width of the strip which can be covered by the apparatus in a single application of the fluid mist. To that end, the present invention includes an elongated bottomless, rectangular, box-type housing having first and second outer sections hingedly attached to a center section. Individual spray bars are mounted within each section with means coupled to each spray bar for individual control of the emitting fluid to the bar. Further, means are coupled to the first and second outer sections for selectively raising and lowering each section thereby enabling the apparatus to be used on areas where inclined surfaces abut horizontal surfaces. Further, transporting the device is easier to accomplish.

Further, it has also been found that certain areas such as around fences, hedges, ditches, and the like need to be sprayed but cannot be reached with the prior art apparatus. Further, the plants in those particular areas which need to be sprayed are sometimes very tall, and thus, must be sprayed by hand or in some other manner. The present invention includes a second spray bar in the first and second outer sections with at least one nozzle on the outer end of said second spray bar. Separately controlled fluid manifolds are connected to each of said second spray bars for individual control of the emitting fluid thereto whereby raising either one of said first and second outer sections enables selective spraying from the second spray bar nozzle around the fence post, hedges, ditches and the like to allow spraying at increased distances and heights from and above the spraying apparatus.

Also, the nozzle on the second spray bar is designed to allow larger drops of fluid to be emitted and those drops of fluid emitted through the nozzles on the individual spray bars are relatively large and heavy whereby the spray from the second spray bar can cover a greater distance from the apparatus into normally non-accessible areas.

Further, right triangular shaped extensions are integrally formed on each inner end of each side of each outer section to overlap the outer ends of the sides of the inner section whereby movement of the outer sections in an upward direction about said hinges to conform to the terrain will not create an opening and allow escape of said mist spray.

Also, each of the three sections includes at least one swivelly mounted wheel attached thereto to enable the apparatus to be propelled over the surface of an area to be sprayed. These wheels include means for locking the wheels individually to allow towing of the apparatus over inclined surfaces without the wheel swivelling.

Further, the present invention includes a tank for foaming a liquid. A foamer nozzle is mounted on the external surface of the outer end of each of the first and second outer sections with means coupled between the tank and each of the foamer nozzles for individual control of the foamed liquid thereto. Further, a motorized pump is used to pressurize the foamer tank to cause transmission of the foamed liquid to a desired one of the foamer nozzles whereby foam may be emitted to serve as a marker indicating the path of travel of the apparatus. The device used to pressurize the foamer tank is a motor-driven compressor.

SUMMARY OF THE INVENTION

Thus, the present invention relates to an improved drift free spraying apparatus adapted for movement in connection with a vehicle and having a spray bar mounted within a bottomless, rectangular, box-type housing in communication with a fluid pump and reservoir assembly and adapted for emitting fluid in a mist configuration upon the surface to be sprayed through nozzles provided in the spray bar, the improvement comprising an elongated, bottomless, rectangular box-type housing having first and second outer sections hingedly attached to a center section, an individual spray bar mounted within each section, means coupled to each spray bar for individual control of the emitting fluid to the spray bar, and means coupled to said first and second outer sections for selectively raising and lowering each section.

The invention also includes a second spray bar in the first and second outer sections with at least one nozzle on the outer end of the second spray bar and means coupled to each of the second spray bars for individual control of the emitting fluid thereto whereby raising of either one of the first and second outer sections enables selective spraying from the second spray bar nozzle to allow spraying around fence posts, hedges, ditches and the like at increased distances and heights from and above the spraying apparatus.

Also, by placing a nozzle on the second spray bar which allows larger and heavier drops of fluid to be emitted, than those on the first spray bar, then the nozzle on the second spray bar enables the spray from the second spray bar to cover a greater distance from the apparatus into normally non-accessible areas.

BRIEF DESCRIPTION OF THE DRAWINGS

These and other objects and attendant advantages of the present invention will be shown in the following specification, reference being had to the drawings in which:

FIG. 1 is a perspective view illustrating the novel apparatus and the three sections thereof wherein one section is extended horizontally and the other section is raised vertically;

FIG. 2 is a cross-sectional view of the foamer tank taken along lines 2—2 in FIG. 1;

FIG. 9 is an isometric view of the mounting bracket for two hydraulic lines, to and from, the hydraulic cylinders utilized to raise and lower the outer sections of the inventive apparatus; and FIG. 10 is a cross-sectional view of the input pressure lines shown in FIG. 9 to illustrate the pressure reducer utilized therein.

DETAILED DESCRIPTION

Figure 3:
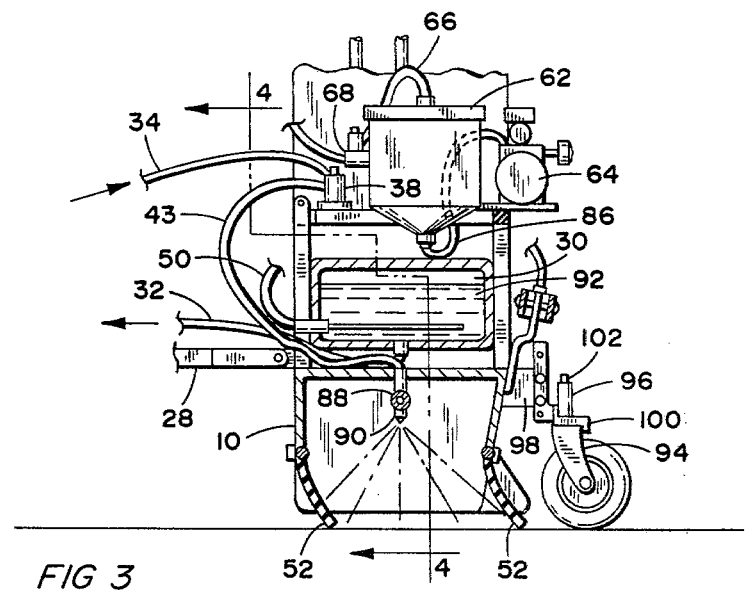
FIG. 3 is a cross-sectional view of the apparatus taken along lines 3—3 in FIG. 1.

FIG. 1 is a perspective view of the present invention from the front thereof and disclosing center section 10, first outer section 12 and second outer section 14. Outer section 14 is shown in partial phantom outline to disclose the spray bars 16 and 18 therein and is also illustrated in the raised or vertical position. First outer section 12 is attached at the upper portion thereof to center portion 10 by a hinge 20 while second outer section 14 is hingedly attached to center section 10 at hinge 22. It will be noted that each of the three sections 10, 12, and 14 are bottomless, rectangular, box-type housings having first and second spray bars therein. Spray bars 24 and 26 are illustrated in phantom lines within first outer extension 12. A frame 28 is also illustrated as attached to center section 10 for towing the apparatus by a vehicle such as a tractor. A fluid tank 30 is also illustrated as mounted on center section 10 and has a hose 32 which is attached to the power take-off of the tractor or other powered device which drives a pump to force the fluid from tank 30 out to the various spray bars including spray bars 16, 18, 24, and 26 shown in FIG. 1. The spray bars in the center section 10 are present but not shown in FIG. 1.

Figure 4:
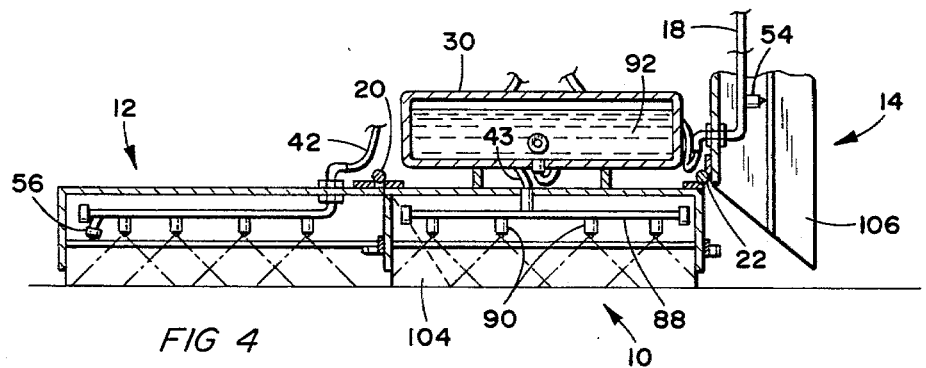
FIG. 4 is a cross-sectional view of the apparatus taken along lines 4—4 in FIG. 3.
Figure 5:
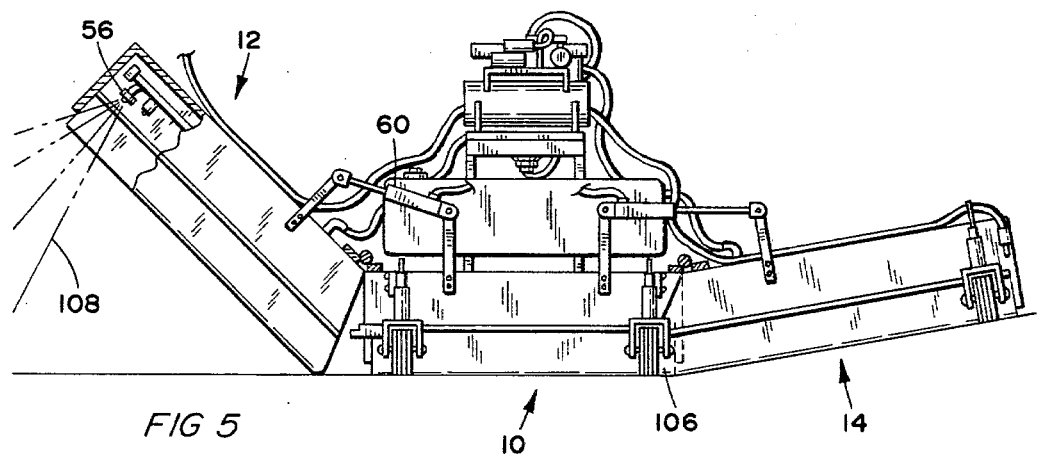
FIG. 5 is a rear view of the apparatus illustrating one of the outer wings in a partially raised position and the other outer section riding on an inclined surface while the center section is riding on a horizontal surface.

A second hose 34 is illustrated in FIG. 1 and is to be attached as a return line to the pump being driven by the power take-off of the tractor or other power source which provides the fluid for the nozzles and spray bars as set forth earlier. A manifold, generally shown at 36, includes five solenoids, each of which is electrically controlled from the tractor or other power source moving the apparatus to allow selective coupling of the fluid to be sprayed to the various spray bars. Thus, the first solenoid 38 on the right looking at FIG. 1 is coupled through hose 40 to spray bar 24 in first outer section 12. Second solenoid 38 is coupled via hose 42 to spray bar 26 in first outer section 12. The center solenoid 38 is coupled through hose 43 to the spray bar 88 in the center section 10 as can be seen in FIG. 4. Fourth solenoid 38 is coupled through hose 44 to spray bar 18 in second outer section 14. Finally, the fifth solenoid 88 is coupled through hose 46 to spray bar 16 in second outer section 14.

Electric pressure regulator 47 is electrically controlled from the operator control panel to maintain any PSI pressure desired on any selected one of the spray bars and spray tips. Thus, the operator is enabled to determine the exact amount of fluid displacement per square foot.

Thus, as shown in FIG. 1, the power take-off unit from the tractor or other power source attached to the apparatus pumps the fluid through the hose 32 from tank 30 and returns it through hose 34 to manifold 36. The output 48 of manifold 36 is coupled through hose 50 back to tank 30 where it circulates again. While passing through manifold 36, the fluid may enter any energized solenoid 38 and be coupled to the proper spray bar in the desired section. The operator of the vehicle such as a tractor which would be pulling the apparatus shown in FIG. 1 has switches at his fingertips to control which solenoid 38 and, thus, which spray bar is to be activated.

Also shown on inner section 10 and outer sections 12 and 14 are the flexible flaps 52 which are described in detail in applicant's issued U.S. Pat. No. 4,186,879. The flaps keep the spray confined and yet adjust to conform to the terrain.

The nozzles 54 on spray bars 18 and 26 in the outer sections 14 and 12, respectively, are of a type which cause a fine mist to be sprayed onto the surface immediately below them. Because the spray bars 18 and 26 are incorporated within the bottomless, rectangular, box-type housings as shown and as described in the issued patent set forth above, the spray is confined to the immediate area under the housing and does not drift with the wind. Nozzles 56 and 58 which are attached to spray bars 24 and 16, respectively, are for a different purpose which will be explained in detail hereinafter.

It will be seen in FIG. 1 that a hydraulic cylinder 60 is coupled to outer extension 12 in order to raise and lower the outer extension. A similar hydraulic cylinder, not shown, is utilized to raise outer section 14 to the vertical position as shown in FIG. 1. Also shown in FIG. 1 is a foamer liquid tank 62 and a compressor unit 64 to pressurize the foamer tank. A hose 66 couples the foamer tank to a manifold 68 which has thereon solenoid valves 70 and 72 which are electrically controlled by the operator to couple the foaming fluid through either hoses 74 or 76 to the nozzles 78 and 80 on the outer ends of outer sections 12 and 14.

The foamer tank is used to provide a marker which indicates the path of travel of the apparatus so that the fluid being sprayed does not have to be wasted by an overlapping operation. In FIG. 1, assuming that the device is being towed with the outer end of outer section 12 being adjacent to the area not yet sprayed, the operator can energize solenoid 72 which also starts compressor 64 which forces fluid through the foaming tank and out hose 66 to solenoid 72, through hose 74 and out to nozzle 78. The spray is in a foamy state and is sprayed intermittently on the surface near the outer edge of outer section 12, thus providing a marker for the operator.

FIG. 2 is a cross-sectional view of the foaming tank shown in FIg. 1. Inside tank 62 is a liquid 82 which becomes a foam 84 when agitated by air pressure from compressor 64 through hose 86. The foam 84, being light and frothy, tends to build up slowly within the loop in hose 66 between the manifold 68 and tank 62 until it is compacted sufficiently for the pressure to suddenly foce it out, thus leaving an empty loop in hose 66 which slowly builds up again with the froth 84. Thus, the mark left by the froth 84 as it passes through nozzle 78 is a series of strips, the length of which may be governed by the pressure of air compressor 64 and the loop in hose 66 which is coupled to manifold 68.

FIG. 3 is a cross-sectional view taken along lines 3—3 of FIG. 1. In this illustration, center section 10 can be seen in cross-section having mounted thereon tank 30 which contains a fluid 92 which is to be sprayed on foliage. The fluid is extracted from the bottom of the tank 30 through hose 32 by the power take-off of the tractor or other power source pulling the apparatus and is returned through hose 34 to solenoids 38 which are formed as part of the manifold 36. After passing through the manifold comprised of solenoids 38, the fluid returns to tank 30 through line 50. One of the solenoids 38, when activated, couples the pressurized fluid through hose 43 to spray bar 88 in center section 10 which has attached thereto a plurality of nozzles 90. As can be seen in FIG. 3, flexible flaps 52 confine the spray from nozzle 90 to the interior of section 10. Draw bar 28 allows the apparatus to be drawn by the tractor or other power source. Wheel 94 is attached by swivel 96 to the frame 98 in order to maintain the apparatus at the proper height above the surface to be treated. If desired, a locking device 100 may lock the wheel shaft 102 to swivel guide 96 in order to prevent the wheel from swivelling while being used as a drag type unit, not as a 3 point coupling, and to lock it in place so that the unit can be used on a hillside because of the incline and the swivelling wheels. The details of the wheel lock are shown in FIG. 6 and FIG. 7.

Also illustrated in FIG. 3 is foaming tank 62 with motorized air compressor 64 coupled thereto by hose 86. The output through hose 66 is coupled as stated earlier to manifold 68 wherein the proper solenoid couples the foam to the nozzles 78 or 80 on the outer ends of outer sections 12 and 14 as desired and as illustrated in FIG. 1.

FIG. 4 is a cross-sectional view taken along lines 4—4 in FIG. 3. In this view, second outer section 14 is raised to the vertical position while first outer section 12 is in the horizontal position and the spray bars 88 and 26 in sections 10 and 12, respectively, are activated. As can be seen, hinge 20 allows outer section 12 to be in the horizontal position while hinge 22 allows outer section 14 to be raised to the vertical position. Further, by selectively controlling the solenoids on the manifold, the operator can deactivate the fluid to spray bar 18 in vertical outer section 14 and cause the fluid 92 in tank 30 to be coupled through hoses 42 and 43 through sections 12 and 10, respectively. The nozzle 56 on the second spray bar in outer section 12 is, of course, not activated as shown in FIG 4, but can be activated if so desired by the operator.

Also shown in FIG. 4 are right triangular shaped extensions 104 and 106 which are integrally formed, respectively, on the inner ends of each side of each outer section 12 and 14. Thus, triangular shaped extension 104 overlaps the outer end of center section 10 while right triangular shaped extension 106 integrally formed with the inner end of both sides of outer extension 14 overlaps the other outer end of the sides of the inner section 10 whereby movement of the outer sections 12 and 14 in an upward direction about hinges 20 and 22 to conform to the terrain will not create an opening or space between center section 10 and the outer sections 12 and 14 to allow escape of the mist spray. This can be best illustrated in FIG. 5 where the second outer extension 14 is inclined a slight amount due to the terrain but bacause of the right triangular shaped extension 106, no space is created between the outer end of center section 10 and the inner end of outer section 14 and thus, the mist spray does not escape. Obviously, when the outer sections 12 and 14 are raised to the vertical position as shown by outer section 14 in FIG. 4, or to a position shown in FIG. 5 by outer section 12, a space is created between the outer end of inner section 10 and the inner end of the raised outer section. In that case, however, no spraying is taking place under the outer section and the space created by the raised position of outer section creates no problem.

Some times, it is desired to spray around fence posts, hedges, ditches, and the like at increased distances and heights from and above the spraying apparatus. This can be accomplished by placing a rain drop spraying head 56 on the outer end of a second spray bar 24 as shown in FIG. 1. As shown in FIG. 5, the operator can utilize the hydraulic system 60 to raise the outer section 12 to any desired height, selectively activate the rain drop spray head 56 and allow the spray 108 to reach the outlying areas. The rain drop type head 56 must be used in this case because the use of the mist type spray heads 54 shown in FIG. 4 and FIG. 5 would, of course, produce the mist type spray which would not extend to any great distance. By using a rain drop type head, larger drops of liquid are formed and, because of their heavier weight, can be propelled a greater distance.

FIG. 6 is a perspective view of the swivel wheel attached to each section of the invented apparatus. Wheel frame 94 has a shaft 102 which normally slides upwardly within bushing or swivel 96 which is attached to frame 98 of the apparatus. If it is desired to lock the wheel in place to prevent it from swivelling, locking device 100 is placed over shaft 102 as indicated. Downwardly projecting tongue 110 fits over and is engagement with the upper portion of wheel frame 94. Upwardly projecting fingers 112 and 114 have a space between them into which fits plate 116 holding swivel or bushing 96. Thus, the fingers 112 and 114 prevent the locking device 100 from moving about a vertical axis, and downwardly projecting tongue 110 prevents wheel frame 94 from moving about the vertical axis defined by its shaft 102. Thus, the wheel is locked in a simple manner.

Figure 6:
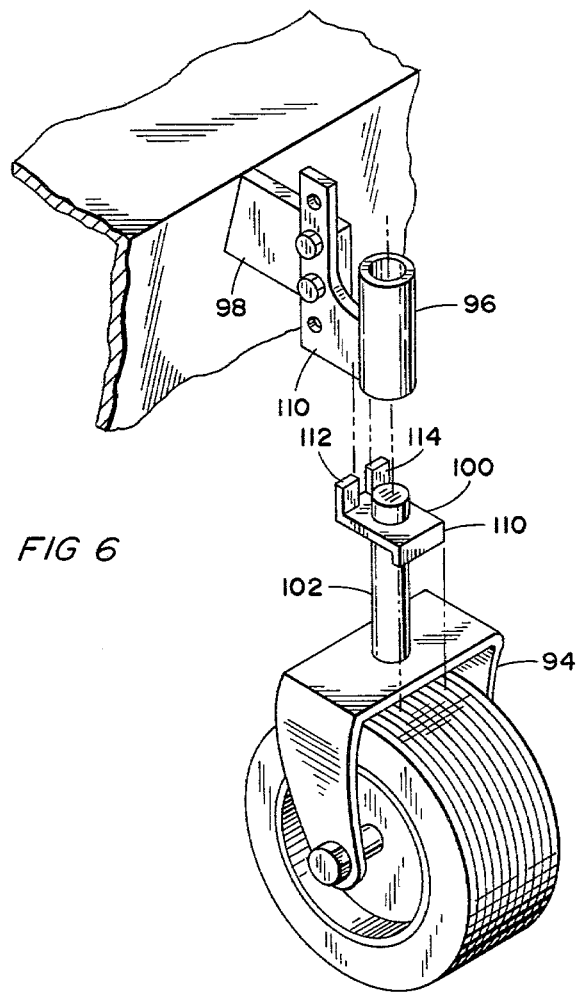
FIG. 6 is a perspective view of the swivel wheel attached to each section of the inventive apparatus.
Figure 7:
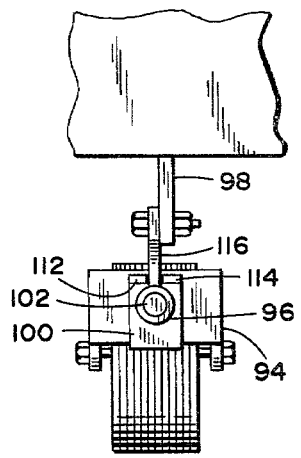
FIG. 7 is a top view of the swivelwheel of FIG. 6.

FIG. 7 is a top view of the wheel attachment and locking device shown in FIG. 6 and clearly illustrates how the fingers 112 and 114 are locked to mounting bracket 116 to prevent rotation about the vertical axis.

Figure 8:
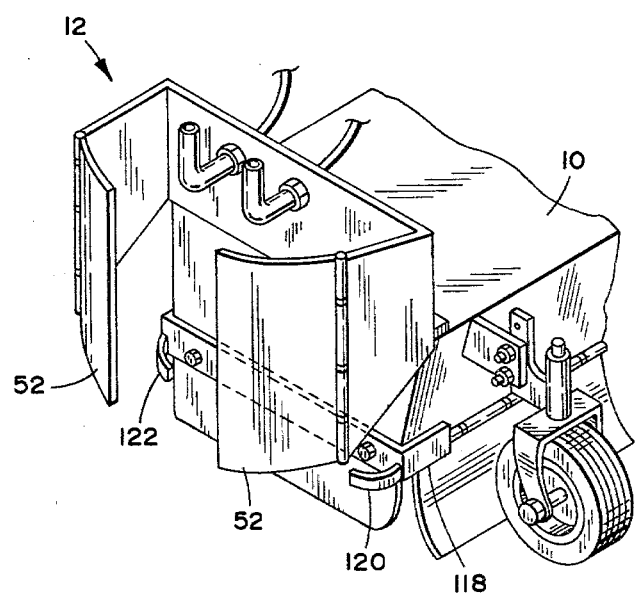
FIG. 8 is a partial view of one of the sections partially raised with respect to the center section to reveal fingers for forcing open the flexible flaps attached to the raised section as the raised section is lowered.

FIG. 8 is a partial view of one of the sections partially raised with respect to the center section to reveal fingers for forcing open the flexible flaps attached to the raised section as the raised section is lowered. As can be seen in FIG. 8, raised outer section 12 has attached thereto flexible flaps 52 which have a tendency to fold inwardly when the sections are in the raised or vertical position. If the hinges become filled with dust, grease, grime or rust, and the outer section 12 is lowered, the flaps 52 may have a tendency to stay in the inward position as shown. In order to prevent this, the inner section 10 is fitted with a bracket 118 which has thereon fingers 120 and 122 which curve inwardly and outwardly such that as outer section 12 is lowered, the flexible flaps 52 contact fingers 120 and 122 and ride against them in such a manner that they are forced downwardly and outwardly by fingers 120 and 122, thus ensuring that the flexible flaps 52 open to their fully extended position as the outer section is lowered. Of course, the other outer section 14 has flexible flaps 52 which are opened in the same manner by another set of fingers 120 and 122 mounted on the other end of center section 10.

FIG. 9 is an isometric view of the mounting bracket for two hydraulic lines, one to each of the hydraulic cylinders utilized to raise and lower the outer sections of the inventive apparatus. Thus, the bottom line 124 is the input line to one of the hydraulic cylinders 60 and the top line 126 is the input line to the other hydraulic cylinder for the other side corresponding to cylinder 60. Both of these lines are secured to a mounting bracket 128 which is securely attached to frame 130.

FIG. 10 is a cross-sectional view of the input pressure line 124 shown in FIG. 9 to illustrate the pressure reducer utilized therein. Without a pressure reducer in the hydraulic lines, when the hydraulic fluid is applied to the hydraulic cylinders to raise and lower the outer sections 12 and 14, there can be a sudden jerk because of the surge of pressure which could be damaging. It is desired that the outer sections 12 and 14 be raised and lowered slowly. To this end, a pressure reducing valve is placed in the input line as shown in FIG. 10. Thus, plug 132 is mounted within coupling 136 and has a small orifice 134 therein. When the surge of hydraulic pressure is applied at the input 138 to raise an outer section 12 or 14, the pressure reducing valve 132, because of the small orifice 134, allows the pressure to slowly build up on the downstream side 140 so that the particular outer section being raised has the hydraulic pressure applied to it in a slow and even manner. Thus, the outer section being raised begins to move slowly and without jerks or sudden movement. In like manner, when the hydraulic pressure is removed at 138 the weight of the section starting to lower forces the fluid at 140 back through small orifice 134 thus slowing the descent of the section.

Thus, there has been disclosed a novel improved drift free spraying apparatus which has a central section to which is hingedly attached first and second outer sections which can pivot about those hinges to enable the outer sections to follow the natural terrain by raising or lowering. Further, a hydraulic system can pull either outer section to any desired height to allow a second type of spray bar and nozzle to be energized and direct a heavier spray at an area located a distance away from the apparatus whereby areas can be sprayed around fence posts, hedges, ditches and the like. Further, the hydraulic system can pull the outer sections entirely in the vertical position, thus allowing easy transport from one location to another.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An improved drift free spraying apparatus adapted for movement in connection with a vehicle having a spray bar mounted within a bottomless, rectangular, box-type housing in communication with a fluid pump and reservoir assembly and adapted for emitting fluid in a mist configuration upon the surface to be sprayed through nozzles provided on said spray bar, said improvement comprising:
    (a) an elongated, bottomless, rectangular, box-type housing having first and second outer sections hingedly attached to a center section, each of said housings having means for passing in close proximity to non-planar areas of said surface for confining spray within said housing,
    (b) an individual spray bar mounted within each section,
    (c) means coupled to each spray bar for individual control of the emitting fluid to said bar,
    (d) means coupled to said first and second outer sections for selectively raising and lowering each section,
    (e) a second spray bar in each of said first and second outer sections,
    (f) at least one nozzle on the outer end of said second spray bar, and
    (g) means coupled to each of said second spray bars for individual control of the emitting fluid thereto whereby raising of either one of said first and second outer sections enables selective spraying from said second spray bar nozzle to allow spraying around fence posts, hedges, ditches, and the like at increased distances and heights from and above said spraying apparatus.

2. An improved apparatus as in claim 1 further including a rain-drop type nozzle on said second spray bar to allow larger drops of fluid to be emitted than the nozzles on said individual spray bars whereby said spray can cover a greater distance from said apparatus into normally non-accessible areas.

3. An improved apparatus as in claim 2, further including right triangular shaped extensions integrally formed on each inner end of each side of each outer section to overlap the outer ends of each side of the inner section whereby movement of the outer sections in an upward direction about said hinges to conform to the terrain will not create an opening between the ends of said inner and outer sections and allow escape of said mist spray.

4. An improved apparatus as in claim 3 further including at least one swivelly mounted wheel attached to each of said sections to enable said apparatus to be propelled over the surface of an area to be sprayed.

5. An improved apparatus as in claim 4 further including means for locking said wheels individually to allow towing of said apparatus over inclined surfaces without said wheels swivelling.

6. An improved apparatus as in claim 5 further including:
(a) a tank for foaming a liquid, said tank being mounted on said apparatus,
(b) a foamer nozzle mounted on the external surface of the outer end of each of said first and second outer sections,
(c) means coupled between said tank and each of said foamer nozzles for individual control of the foamed liquid transferred thereto from said tank, and
(d) means for pressurizing said foamer tank for transmitting said foamed liquid to a desired one of said foamer nozzles whereby foam may be emitted to serve as a marker indicating the path of travel of said apparatus.

7. An improved apparatus as in claim 6 wherein said pressurizing means is a motor driven compressor.

8. An improved apparatus as in claim 7 further including:
(a) flexible flaps hingedly coupled to the base of the front and back sides of each of said sections, and
(b) means mounted on each outer end of said center section for ensuring that said flaps on said outer sections are in the downward position when said outer sections are lowered from a vertical position to a horizontal position.

9. An improved apparatus as in claim 8 wherein said means for ensuring that said flaps are moved downwardly comprises:
(a) an elongated bracket attached to each end of said mounting bracket curving inwardly and outwardly and being located such that as said outer section is lowered, the flexible flaps thereon contact the first and second fingers to ride on them, therefore being forced outwardly and downwardly.

* * * * *